March 9, 1926.
W. H. EVANS
1,575,825
COMMUNION BREAD BAKER
Filed Jan. 25, 1923
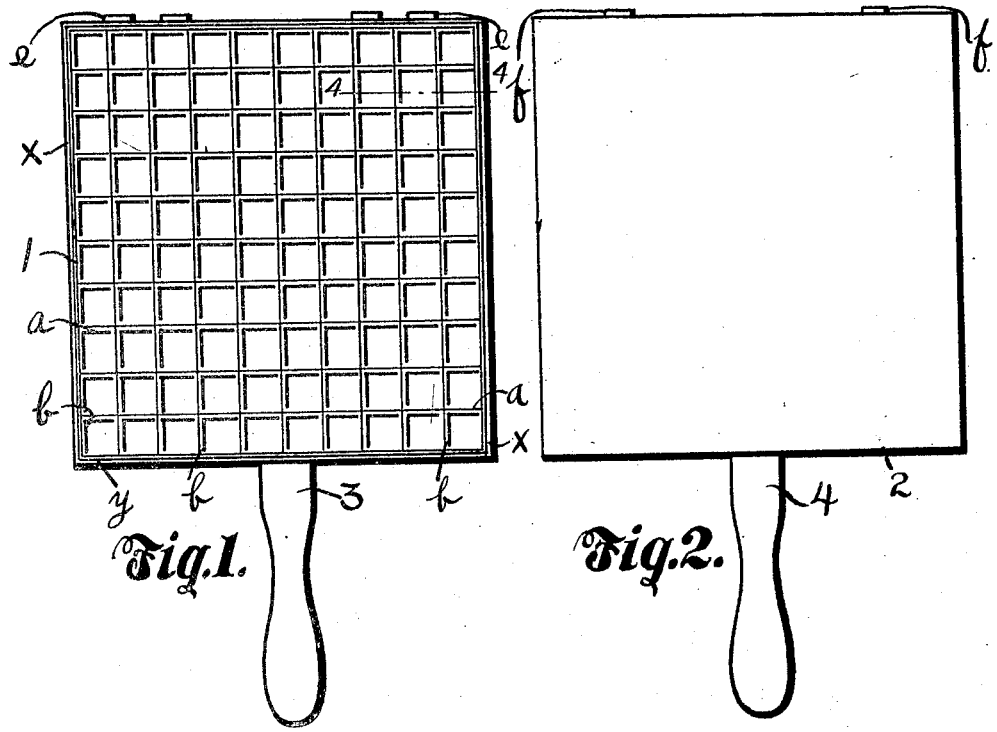
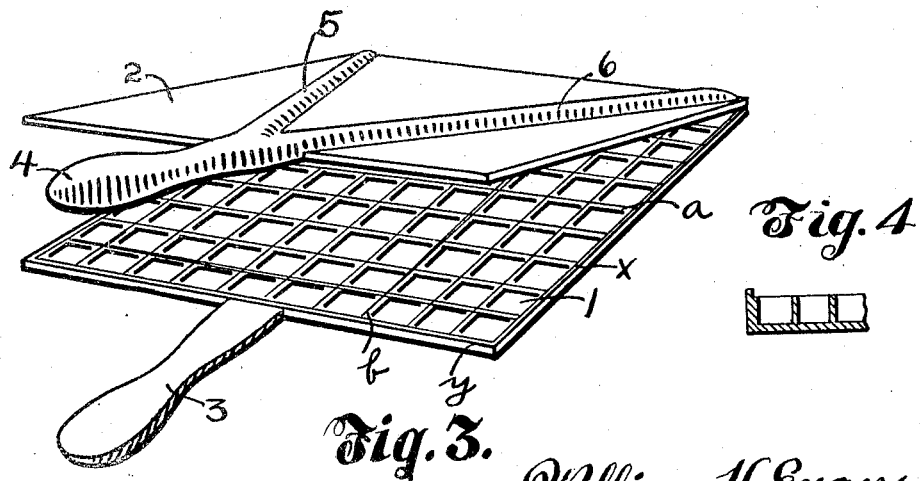
William H. Evans, Inventor
By John M. Spellman, Attorney Patented Mar. 9, 1926.

1,575,825

UNITED STATES PATENT OFFICE.

WILLIAM H. EVANS, OF DALLAS, TEXAS.

COMMUNION-BREAD BAKER.

Application filed January 25, 1923. Serial No. 614,806.

*To all whom it may concern:*

Be it known that I, WILLIAM H. EVANS, citizen of the United States, residing at Dallas, in the county of Dallas and State of Texas, have invented certain new and useful Improvements in Communion-Bread Bakers, of which the following is a specification.

This invention relates to a device for baking communion bread and at the same time marking or indenting the bread so that it may be easily broken up into segments for the communion service.

The invention consists of two plates of equal size, hinged together by a suitable means at one end and supporting operating handles on the other end; on the upper surface of the lower plate are elevations of equal height so arranged as to form impressions upon the bread dough placed thereon, thus marking same in substantially square shapes. Around the outer edges of the squares formed by the aforesaid elevations are elevations of height sufficient to contact with the under side of the upper plate, the surface of that side being smooth, and in such contact trim the dough in a large square comprising the area of the smaller squares, collectively. The handles so shaped that they may be pressed together, thus bringing the upper and lower plates in contact, and after the baking process is completed they are drawn apart and the squares may be easily broken off, as desired.

A feature of the invention is to produce a loaf of regulation thickness and size for each communicant.

Other features will be set forth in the following description, taken in connection with the drawings attached hereto, as follows:

Figure 1 shows a top or plan view of the lower plate.

Figure 2 shows a plan view of the lower side of the upper plate.

Figure 3 represents a perspective view of the two plates assembled.

Figure 4 is a section on the line 4—4 of Fig. 1.

In Figure 1, the body of the plate 1, with elevations $a$ and $b$, is shown, and larger elevations $x$ and $y$ around the edges of the plate 1, with handle 3 forming an extension, the handle being substantially convex on the lower side and flat on the upper side, in order that a handle 4 of similar shape (in Figure 2) may contact evenly with the flat side of handle 3.

In Figure 2, the upper plate 2, the under surface of which is substantially level, is shown, with handle 4 forming an extension thereto and in construction similar to handle 3. Hinge members $e$, $e$ and $f$, $f$ are provided on the plates which are adapted to be connected by pintles in the ordinary manner.

In Figure 3, the dough is placed on the surface of 1 and plate 2 is compressed thereon, handle 4 resting upon handle 3, the device is placed over a flame, and the baking process takes place and when completed, the plate 2 is raised by handle 4 and the baked wafers or bread removed in the large squares, with impressions of the smaller squares thereon to enable facile sub-division of the large square. Means 5 and 6 in substantially V shape, with the point of the V adjacent to the handle, and the bars of the V extending to the corners of the plate on the opposite side from the handle, are cast in one piece with the handle and the plate. This is true in the case of each plate.

What is claimed is:

In a comunion bread baker, the combination of two plates, one of said plates having an edge trimming flange around its periphery and a plurality of crossing subdividing elevations within said periphery and of less height than said peripheral flange, the other of said plates being free of elevations, each of said plates having a flat faced handle member, the second named plate being adapted to contact with the peripheral elevation of said first named plate with the flat faces of the handle members in contact with each other.

In testimony whereof I have signed my name to this specification.

WILLIAM H. EVANS.